United States Patent [19]

Hirschberger

[11] Patent Number: 4,940,403
[45] Date of Patent: Jul. 10, 1990

[54] DUAL PARISON EXTRUSION HEAD FOR MULTI-LAYER BLOW MOLDING

[75] Inventor: Michael Hirschberger, Sylvania, Ohio

[73] Assignee: Hoover Universal, Inc., Ann Arbor, Mich.

[21] Appl. No.: 345,566

[22] Filed: May 1, 1989

[51] Int. Cl.[5] .............................................. B29C 47/26
[52] U.S. Cl. .................................. 425/133.1; 425/466; 425/532
[58] Field of Search ............. 425/133.1, 532, 462–464, 425/466; 428/36.91; 264/209.1, 540

[56] References Cited

U.S. PATENT DOCUMENTS

| | | | |
|---|---|---|---|
| 2,854,691 | 10/1958 | Strong | 425/532 X |
| 2,980,955 | 4/1961 | Sanko | 425/532 |
| 3,044,112 | 7/1962 | Perry | 425/532 X |
| 3,048,890 | 8/1962 | Soubier | 425/532 X |
| 3,564,653 | 2/1971 | Sparks et al. | 425/532 X |
| 4,047,868 | 9/1977 | Kudo et al. | 425/133.1 |
| 4,179,251 | 12/1979 | Hess et al. | 425/532 X |
| 4,657,497 | 4/1987 | Dehennau et al. | 425/133.1 |

Primary Examiner—Richard L. Chiesa
Attorney, Agent, or Firm—Harness, Dickey & Pierce

[57] ABSTRACT

Dual parison extrusion head for multi-layer extrusion blow molding in which a die body surrounds two parallel spaced mandrels to form two cylindrical passages from which parisons are extruded. A series of resin supply conduits are provided for directing each resin to both passages. The series of conduits are axially spaced in the extrusion head to direct a plurality of plastic resins to each of the passages to form a multi-layer parison. The resin supply conduits are symmetrical about a vertical plane transversely bisecting the extrusion head between the two passages to produce flow and thermal symmetry in the resin to balance the resin flow to both passages. The resin supply conduits are configured so as to produce the dual parisons with the resin weld line of the multiple resin layers being located on the blow mold parting line. The resin conduits are positioned to minimize the center distance between parisons to reduce the size of the extrusion head. This is accomplished in part by feeding the resin downwardly before the resin flows into the cylindrical passages to form the parisons.

12 Claims, 2 Drawing Sheets

DUAL PARISON EXTRUSION HEAD FOR MULTI-LAYER BLOW MOLDING

BACKGROUND AND SUMMARY OF THE INVENTION

This invention relates to a dual parison extrusion head and in particular one useful for production of multilayer plastic parisons.

The use of multiple layer plastic containers for various applications is increasing rapidly. Product packaging for food, cosmetics, chemicals, etc. can often be improved by the use of plastic containers having multiple resin layers exhibiting different material characteristics. For example, catsup containers typically have six layers. From the exterior surface radially inward, these layers include: (1) a polypropylene layer for structural strength and hot fill capability; (2) an adhesive layer; (3) an oxygen barrier layer; (4) a second adhesive layer; (5) a layer of reground plastic resin; and (6) a second polypropylene layer. To produce a multi-layered blow molded plastic container, it is necessary to form a plastic parison having layers of the various plastic resins.

To improve the efficiency of the production process of plastic containers, it is often advantageous to utilize a dual parison extrusion head with resin from a single extruder being used to form two parisons. A dual parison extrusion head divides the flow of resin from the extruder in two, to form the two parisons. By forming two parisons instead of one, the productivity of the process can almost be doubled with little machinery or operating cost increase. In the production of a multilayered parison, a separate extruder is required for each resin.

It is desireable to minimize the distance between the two parisons in a dual parison extrusion head. By minimizing the parison centerline distance, the size of other machine components can be decreased, such as the molds. With smaller molds, the distance between the various positions the molds must travel through in the production process can be reduced, enabling a possible reduction in the overall process time. Minimum parsion center distance is also desireable when retrofitting a single parison machine with a dual parison head. In such a case, the size of the extrusion head must be minimized to avoid other machinery and reduce the alteration of the machine. It is an object of this invention therefore to minimize the parison center distance in a dual parison extrusion head.

With a dual parison extrusion head, the resin flow from the screw extruders is divided to feed two cylindrical passages to form two parisons. The resin flow to each of the cylindrical passages must be balanced in terms of equal resin flow rate so as to produce parisons and, ultimately plastic containers, which are equal in weight. It is another objective of the present invention therefore, to provide a dual parison head with balanced resin flow rates to each parison to produce containers of equal weight.

In an extrusion head, it is desired to provide resin flow passages which are streamlined to avoid or minimize stagnation points where the resin flow is blocked. Resin can remain at a stagnation for an excessive length of time such that the resin is overheated and begins to degrade. The degraded resin can result in noticeable scorched resin in the molded container. Valves, such as flow plugs used to adjust the resin flow, form restrictions in the flow passage which can result in stagnation points. Accordingly, it is another objective of the present invention to streamline the resin flow passages by minimizing the use of flow plugs to reduce or eliminate stagnation points.

In the formation of a plastic parison, the resin is directed into a vertical cylindrical passage in the extrusion head to form a tubular body of plastic resin. The parison is formed as this plastic body is extruded from the cylindrical passage through an opening at the lower end of the extrusion head. To form the tubular body of resin, the resin typically flows into the cylindrical passage at a single location on the periphery of the cylindrical passage. The resin divides into two streams flowing circumferentially in opposite directions through the cylindrical passage. When these two streams flow into each other, a weld line is formed in the tubular body.

It is often desirable to position this weld line such that it coincides with one of the parting lines of the mold. This results in a finished container having only one line appearing on its exterior surface. Placing the weld line on the parting line is desirable for aesthetics. If the weld line is not hidden on the parting line, the container may be considered to be defective or of low quality by consumers. This is especially true for transparent multilayer containers in which the weld line from each layer may be visible. Therefore, in the production of a transparent multi-layer container, it is particularly desirable to position the weld line of each layer on the mold parting line. It is a further objective of this invention therefore, to provide a dual parison extrusion head in which the weld line in the parison coincides with one of the parting lines in the associated molds.

The location of the parison weld lines is primarily determined by the location, in the extrusion head, where the resin flow is divided in two to form a tubular resin body. To provide resin conduits in the extrusion head which place the weld line on the mold parting line, while attempting to meet the other objectives of this invention such as, minimizing the parison center line distance, balancing the resin flow rate to each parison and streamlining the flow passages to avoid stagnation is a more difficult task than attempting to achieve each objective individually.

The extrusion head of the present invention has been designed to provide a natural balance of resin flow to the two parisons. With a natural balance, the resin flow to each parison is equal with a minimal need for valving so that the flow passages are streamlined. Natural balance is achieved by providing indentical resin flow conduits to each parison and by providing identical temperature profiles to the resin flow conduits. This is accomplished by making the extrusion head symmetrical about a center plane between the two parison forming cylindrical passages. With mirror-image symmetry, the flow passages will be identical as will be the thermal profiles.

Natural balance is further achieved by designing the resin flow passage such that the pressure drop over the conduits is large. By having a large pressure drop, variations in the resin pressure from one side of the head relative to the other will have little effect on the relative resin flow rates.

The dual parison extrusion head of the present invention includes two cylindrical mandrels in a parallel spaced relation to one another, each having a generally upright longitudinal axis. A die body surrounds the two mandrels and is spaced from each mandrel to form a cylindrical passage between each mandrel and the die body. Each of the cylindrical passages has an open lower end forming an annular outlet orifice at the bottom of the extrusion head.

A series of conduits are provided in the extrusion head for supplying each plastic resin to the cylindrical passages. For each resin used in the multiple layer parison, there is a resin inlet, a pair of resin feed tubes, a pair of annular chambers and a pair of inverted frusto-conical shaped conduits to direct the resin into the cylindrical passages. A separate series of conduits are provided for each resin layer. Each series of conduits are axially spaced from one another.

The resin inlets are positioned along a vertical plane bisecting the extrusion head between the two mandrels. At each inlet, the resin flow stream is divided into the two feed tubes, one tube is directed toward each of the cylindrical passages. The feed tubes direct the resin to the annular chambers which are concentric about the cylindrical passages. The feed tubes join the annular chambers at chamber entrance portions which are located on a vertical bisecting plane containing the longitudinal axes of the two cylindrical passages.

The annular chambers are spaced axially below the chamber entrance portions such that the resin flows substantially downwardly from the feed tubes into the annular chambers. By initiating downward flow of the resin before it flows into the cylindrical passages, the parison center distance can be reduced. From the annular chambers, the resin flows through the inverted frusto-conical conduits into each cylindrical passage to form a downwardly flowing tubular plastic body. These plastic bodies flow through the annular outlet orifices to form tubular parisons below the extrusion head.

The plastic resin from the axially uppermost series of resin conduits flows into the cylindrical passage between the mandrel and the die body. The next adjacent lower series of resin conduits directs resin between the first resin and the die body. Each adjacent lower series of resin conduits directs resin between the outer resin layer and the die body, so as to form a multi-layer plastic resin body which is extruded through the annular outlet orifice to form a multi-layered plastic parison.

Each series of conduits are symmetrical about the vertical plane bisecting the head between the two cylindrical passages. This provides flow and thermal symmetry to the resin to produce a balanced resin flow to minimize the need for valving in the extrusion head which in turn minimizes stagnation and resin degradation.

As the resin flows into the annular chambers, the resin flow is divided into two streams, which flow around the annular chambers in circumferentially opposite directions. The two streams join together forming a weld line diametrically opposite the annular chamber entrance portions. The blow mold cavity is oriented below the extrusion head such that the parting line between the mold halves coincides with the weld line.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
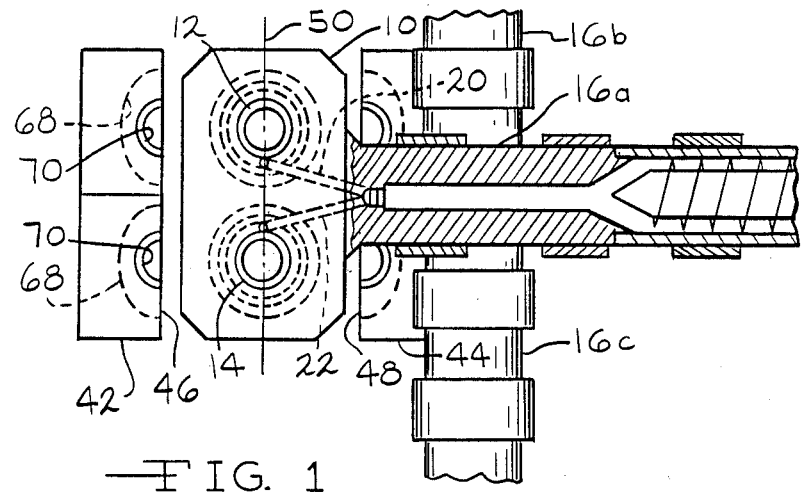
FIG. 1 is a combined plan and sectional view of the dual parison extrusion head of the present invention showing three screw extruders and two mold halves below the extrusion head.
Figure 2:
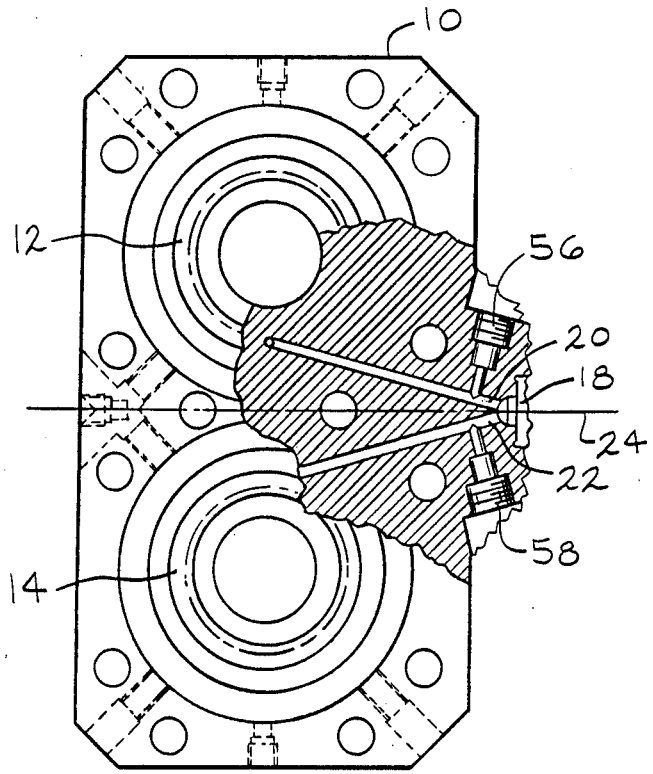
FIG. 2 is an enlarged plan view of the extrusion head with a portion broken away and shown in section to illustrate the resin supply conduits in the extrusion head.
Figure 3:
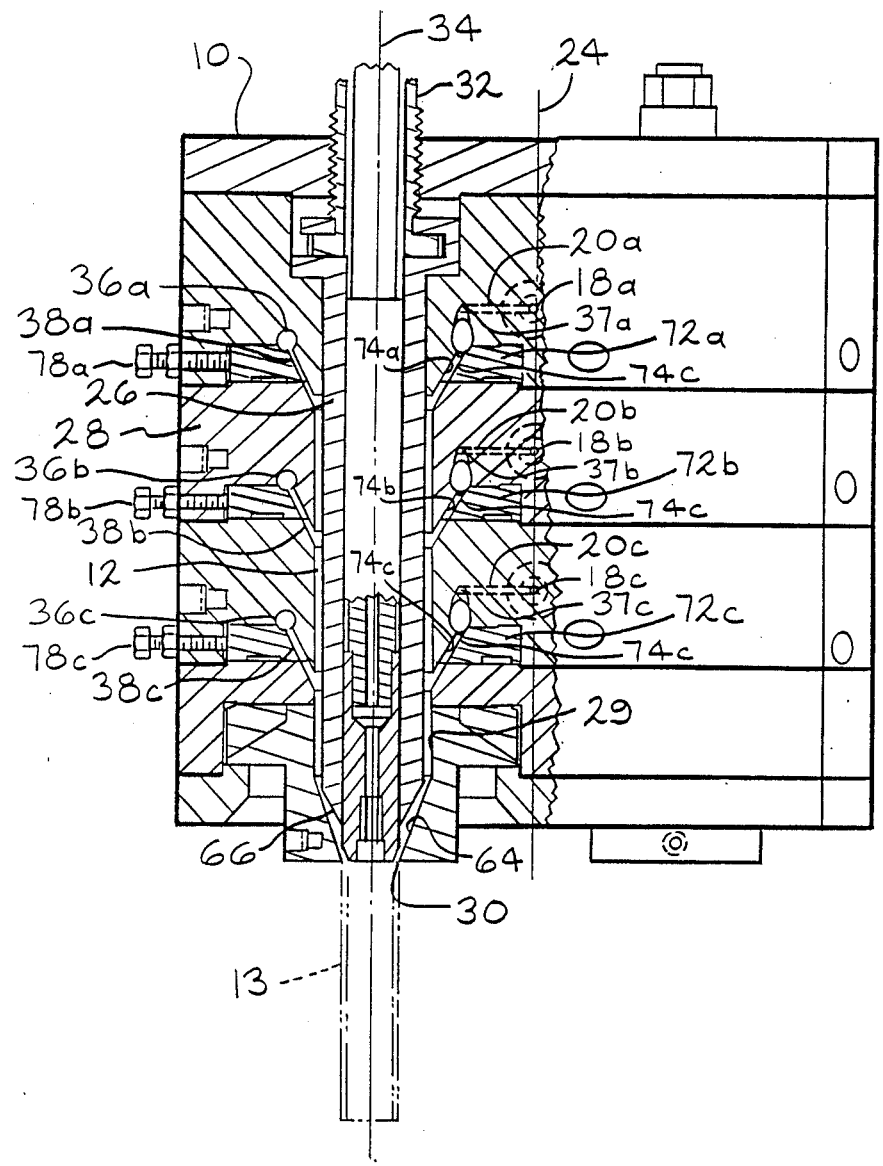
FIG. 3 is an elevational view of the extrusion head with a portion broken away and shown in section to show a cylindrical passage from which a parison is extruded.

The dual parison extrusion head of this invention is shown in FIGS. 1 through 3 and designated generally at 10. The head 10 includes two vertical cylindrical passages 12 and 14, each for forming a multiple layer plastic parison such as the parison 13 shown below passage 12 in FIG. 3. The head 10 shown and described below is equipped to produce a three layer parison. It is to be understood that the present invention is not limited to the production of a three layer parison but that the extrusion head can be equipped to produce parisons with additional layers. A separate screw extruder, such as the extruders 16a-c, is required for each resin.

For each resin layer, there is a series of resin supply conduits for directing the resin from one of the inlets 18 to each of the two passages 12 and 14. The series of conduits includes resin feed tubes 20 and 22 which direct the flow of resin from inlet 18 toward the passages 12 and 14 respectively. The head 10 is symmetrical about a vertical transverse plane 24 which bisects the head 10 between the two passages 12 and 14. The resin inlet 18 is positioned on the center line of the head 10 and is bisected by the plane 24.

With reference to FIG. 3, the interior of extrusion head 10 is shown in detail. The cylindrical passage 12 is formed about a cylindrical mandrel 26. The mandrel 26 is disposed within a bore 29 in the die body 28. The surface of the bore is spaced from the mandrel so as to form the cylindrical passage 12 having an upright longitudinal axis 34. The cylindrical passage 12 is open at its lower end forming an annular outlet orifice 30. In operation, resin flows into the cylindrical passage 12 to form a tubular resin body. The tubular body flows out through the orifice 30 to form the tubular parison 13.

The diameter of the lower end of the cylindrical passage 12 is reduced immediately before the outlet orifice 30. The surface of the bore at the lower end of the passage 12 is inclined radially inwardly and downwardly as shown at 64. The lower surface of the mandrel at 66 is also inclined radially inwardly and downwardly to correspond to the die body inner surface 64.

The mandrel is supported in the die body by a threaded collar 32 in the top of the die body. The collar 32 can be rotated to axially raise or lower the mandrel. Axial movement of the mandrel varies the spacing between the inclined mandrel end surface 66 and the inclined die body end surface 64. This enables adjustment of the resin flow rate through the orifice 30 to balance the total weight of the parisons to equalize the weight of the containers produced by the two parisons.

As shown in FIG. 3, the diameter of the outlet orifice is reduced from the diameter of the cylindrical passage 12. This orifice diameter can also be increased by inclining the lower end surfaces of the die body and mandrel radially outward and downward as opposed to radially inward as shown.

The extrusion head 10, shown in FIG. 3, includes three axially spaced resin inlets 18a, 18b, and 18c for three separate plastic resins used to form the multi-layer plastic parison 13. A series of resin supply conduits are provided for directing the plastic resin from each inlet to the cylindrical passage 12. Each series of conduits includes a generally horizontal resin feed tube 20a–c for directing the plastic resin from the inlets 18a–c to annular chambers 36a–c respectively about cylindrical passage 12. Each of the annular chambers 36a–c are concentric about the passage 12 and include entrance portions 37a–c above the chambers. The resin flows from the chamber entrance portions 37a–c downwardly into the annular chambers 36a–c to begin vertical flow of the resin. Once in the annular chambers, the resin will flow in both directions circumferentially through the annular chambers 36a–c and join together diametrically opposite the chamber entrance portions 37a–c forming a weld line.

The cross sectional area of the annular chambers, as viewed in vertical section in FIG. 3 decreases from a maximum area immediately below the chamber entrance portions 37a–c to a minimum area diametrically opposite the entrance portions. The decrease in area is uniform in both circumferential directions through the annular chambers.

Inverted frusto-conical conduits 38a–c direct the flow of resin from the annular chambers 36a–c radially conduits 38a–c are formed by rings 72a–c forming the lower portion of the annular chambers 36a–c. The inner surfaces 74a–c of the rings 72a–c are inclined radially inwardly and downwardly and spaced from inclined wall portions 76a–c of the die body 28 to form the inverted frusto-conical conduits 38a–c.

The position of the rings 72a–c can be adjusted by one or more adjusting screws 78a–c associated with each ring. Adjustment of the ring position enables the thickness of each resin layer to be adjusted for uniformity within the layer.

A first resin, from the uppermost resin inlet 18a, flows into the passage 12 between the mandrel 26 and the die body 28. As the first resin flows downwardly through the passage, a second resin from the axially adjacent lower inlet 18b will flow into the passage between the first resin and the die body 28 to radially surround the first resin and form a flow of resin having two layers. As the two-layer resin body flows downwardly, a third resin from inlet 18c flows into the passage 12 to surround the second resin layer. The head 10 thus forms a multi-layer plastic parison in which each resin layer is formed on the exterior of the resin body.

FIG. 3 illustrates the resin supply conduits for the cylindrical passage 12. The resin supply conduits are identical for supplying resin to cylindrical passage 14 and are mirror-images of the conduits described with respect to the passage 12. The supply conduits to passages 12 and 14 are symmetrical as are the two halves of the extrusion head, resulting in thermal symmetry to the each of the passages 12 and 14. The thermal symmetry results in a more equally balanced resin flow to form each parison minimizing the need for intrusive flow plugs.

As can be seen from the above description, the conduits in the extrusion head form resin supply means for directing resin from the screw extruders into the cylindrical passages to form tubular bodies that are extruded to form the parisons.

Referring to FIG. 1, two mold halves 42 and 44 are shown in an open position beneath the head 10. The mold halves form a pair of mold cavities 68 having top openings 70. After the dual plastic parisons have reached a sufficient length, the two mold halves will close together about the dual parisons. The mold will then move horizontally away from the head, separating the enclosed parison from the plastic body flowing from the annular outlet orifice. The mold moves to a blowing position where the parison is blow molded into conformity with the mold cavity.

When the mold halves close, the vertical surface 46 of mold half 42 engages the corresponding vertical surface 48 of the mold half 44. The mold surfaces 46 and 48 will engage one another along the vertical plane 50 which contains the axes of the two passages 12 and 14. When the plastic parisons are blow molded into conformity with the shape of the mold cavities, a line will be formed on the exterior of the molded plastic body caused by the joint in the mold cavity where the two mold surfaces 46 and 48 engage one another. This line is referred to as the parting line because it is formed by the line where the two mold halves part from one another to open the mold.

When molding plastic containers, it is often desirable to have the weld line or lines formed in the parison coincide with the parting line formed by the two mold halves for aesthetic reasons. To accomplish this, the resin feed tubes 20 and 22 from the resin inlet 18 are positioned so as to direct the plastic resin to the annular chambers at a location on the vertical plane 50 containing the axes of the passages 12 and 14. The plastic resin flows through the two annular chambers circumferentially in opposite directions from the chamber entrance portions and joins together, forming a weld line at the diametrically opposite side of the annular chambers from the feed tubes 20 and 22. This diametrically opposite location is also located on the vertical plane 50. By locating the parison weld line and the mold parting line on the vertical plane 50, the weld lines coincide with the parting line on the molded plastic container.

The quantity of resin flowing through the feed tubes 20 and 22 can be adjustable by flow adjusting plugs 56 and 58 respectively. Adjusting plugs 56 and 58 allow the operator to adjust the resin flow to each passage independently if necessary to achieve equal flow rates to the two parisons.

The resin feed tubes 20 and 22 from the resin inlet 18 to the annular chambers are straight for ease of machining. In a horizontal cross-section, the resin feed tubes 20 and 22 are symmetrical and form a "V" with the base of the "V" at the inlets. The feed tubes terminate at ends above the annular chambers so that the resin flows downwardly from the tubes into the chambers. An advantage of feeding downward into the annular chambers, as opposed to horizontally, is that the annular chambers can be moved closer together. By moving the annular chambers together, the center distance between the parisons is further reduced.

An advantage of constructing the head symmetrically about a transverse plane 24 bisecting the head between the two passages 12 and 14 is that flow and thermal symmetry will be produced in the resin forming the two parisons. This enables balancing of the resin flow with minimum flow restricting valving to produce containers with the same thermal history and properties.

The feed tubes, the annular chambers and the inverted frusto-conical conduits are all constructed so as to be completely filled with flowing resin under pressure from the screw extruders. The feed tubes are designed such that the pressure drop through the tubes is in the range of 400-2,000 psi and preferably 1,000 psi. The flow under high pressure drop induces equal flow in the two feed tubes to form the two parisons such that the flow plugs may be eliminated to further streamline the resin conduits. With a high pressure drop in the feed tubes, a variation in the pressure of the resin flowing into the feed tubes will have a minimal impact on the relative flow rates.

It is to be understood that the invention is not limited to the exact construction described above, but that various changes and modifications may be made without departing from the spirit and scope of the invention as defined in the following claims.

What is claimed is:

1. An extrusion head for continuously producing dual parisons of plastic resin for blow molding plastic articles, comprising:

a single die body;

means within said die body for forming two parallel cylindrical resin flow passages each having an upright longitudinal axis, said cylindrical passages each having an open lower end forming an annular outlet orifice;

resin supply means within said die body for directing plastic resin into said cylindrical passages to form a longitudinally flowing resin body within each said cylindrical passage; and said resin supply means including a resin inlet, a pair of resin feed tubes through which resin flows from said inlet toward said cylindrical passages, said pair of tubes being symmetrical with respect to one another about a vertical plane bisecting said die body between said cylindrical passages, said tubes terminating at ends opposite said inlet which are located on a vertical plane containing the longitudinal axes of said cylindrical passages and an annular chamber concentric about each of said cylindrical passages and spaced vertically downstream from said feed tubes, said chambers being in communication with the terminal ends of said feed tubes so that resin flows vertically from said feed tubes into said annular chambers and flows through said chambers in circumferentially opposite directions joining together diametrically opposite from said feed tube terminal ends at locations on said vertical plane containing the axes of said cylindrical passages.

2. The extrusion head of claim 1 further comprising means operatively associated with said feed tubes for independently adjusting the flow of resin within each of said resin feed tubes to equalize resin flow through said feed tubes.

3. The extrusion head of claim 1 wherein said resin supply means includes a plurality of axially spaced resin inlets and a pair of resin feed tubes for each inlet for directing a plurality of resins toward said cylindrical passages to form a multiple resin layer body within said cylindrical passages with the resin from each inlet flowing into the cylindrical passage so as to radially surround the resin supplied from the adjacent axially upward resin inlet.

4. The extrusion head of claim 1 wherein said feed tubes are of a size such that the pressure drop in the resin flowing through said tubes is in the range of 400 psi to 2,000 psi so as to enable substantially equal resin flow through said feed tubes.

5. The extrusion head of claim 4 wherein the pressure drop in said feed tubes is approximately 1,000 psi.

6. An extrusion head for continuously producing dual tubular parisons of multiple plastic resin layers for blow molding plastic articles comprising:

a single die body forming two upright parallel cylindrical passages each having an upright longitudinal axis, said cylindrical passages each having an open lower end forming an annular outlet orifice;

resin supply means within said die body for directing a plurality of plastic resins to said cylindrical passages with said resins flowing into said cylindrical passages at vertically spaced locations, each resin flowing into the cylindrical passages so as to radially surround the resin flowing into the cylindrical passages at the adjacent axially upward location to form a multiple layer plastic body flowing longitudinally in said cylindrical passages and through said outlet orifices to form said tubular parisons; and said supply means including an inlet for each resin, a pair of resin feed tubes through which resin flows from each inlet toward said cylindrical passages, said tubes being symmetrical about a vertical plane bisecting said die body between said cylindrical passages, said tubes terminating at ends opposite said inlets on a plane containing the longitudinal axes of said cylindrical passages and an annular chamber concentric about each of said cylindrical passages and spaced vertically downstream from said feed tubes, said chambers being in communication with the terminal ends of said feed tubes so that resin flows vertically from said feed tubes into said annular chambers and flows through said chambers in circumferentially opposite directions joining together diametrically opposite from said feed tube terminal ends at locations on said vertical plane containing the axes of said cylindrical passages.

7. The extrusion head of claim 6 further comprising means operatively associated with said feed tubes for independently adjusting the flow of resin within each of said tubes to equalize the resin flow through said feed tubes.

8. An extrusion head for continuously producing dual tubular parisons of multiple plastic resin layers for blow molding plastic articles, comprising:

two cylindrical mandrels in parallel spaced relation to one another;

a single die body surrounding said mandrels in a spaced relation thereto so as to form a cylindrical passage surrounding each of said mandrels, each of said cylindrical passages having a generally upright longitudinal axis and an open lower end forming an annular outlet orifice;

resin supply conduit means for directing flow of multiple resins into said cylindrical passages, said resin supply conduit means being symmetrical about a transverse vertical plane bisecting said die body between said cylindrical passages so as to produce substantial flow and thermal symmetry in the resin within said resin supply conduit means;

said resin supply conduit means directing said resins into said cylindrical passages at axially spaced locations with each resin flowing into said cylindrical passages so as to surround the resin from the adjacent axially upward location to form a longitudinally flowing plastic body in the cylindrical passages formed of multiple resin layers;

said resin supply conduit means for each resin layer including a resin inlet bisected by said transverse vertical plane, an annular chamber concentric about each of said cylindrical passages having a chamber entrance portion, a pair of resin feed tubes for directing resin from said inlet to said chamber entrance portions, said annular chambers being spaced axially below said chamber entrance portions so that resin flows substantially downwardly into said annular chambers so as to initiate vertical flow of the resin, and inverted frusto-conical conduits between said annular chambers and said cylindrical passages for directing flow of resin from said annular chambers into said cylindrical passages;

said resin feed tubes terminating at said chamber entrance portions at locations on a vertical plane containing said upright longitudinal axes of said cylindrical passages; and the flow of resin in said annular chambers being divided in two so as to form two resin streams flowing in circumferentially opposite directions from said chamber entrance portions, said resin streams joining one another and forming a weld line diametrically opposite said chamber entrance portions.

9. The die head of claim 8 further comprising means operatively associated with said feed tubes for independently adjusting the flow of resin within each of said resin feed tubes to equalize resin flow through said feed tubes.

10. The extrusion head of claim 8 wherein:

said mandrels terminate in lower end surfaces which are radially inclined;

said die body having a pair of cylindrical bores in which said mandrels are disposed to form said cylindrical passages, said bores terminating in radially inclined lower end surfaces opposite said mandrel lower end surfaces; and means for mounting said mandrels within said bores including means for axially raising and lowering said mandrels to vary the spacing between said mandrel lower end surfaces and said bore lower end surfaces to vary the relative resin flow rates from said cylindrical passages.

11. The extrusion head of claim 8 wherein said feed tubes are of a size such that the pressure drop in the resin flowing through said tubes is in the range of 400 psi to 2,000 psi so as to enable substantially equal resin flow through said pair of feed tubes.

12. The extrusion head of claim 11 wherein the pressure drop in said feed tubes is approximately 1,000 psi.

* * * * *